(12) United States Patent
Eriksson et al.

(10) Patent No.: US 9,312,975 B2
(45) Date of Patent: Apr. 12, 2016

(54) METHOD AND SYSTEM FOR INITIATING BI-DIRECTIONAL COMMUNICATION IN A TIME-DIVISION DUPLEX COMMUNICATION SYSTEM

(71) Applicant: Telefonaktiebolaget L M Ericsson (publ), Stockholm (SE)

(72) Inventors: Per-Erik Eriksson, Stockholm (SE); Daniel Cederholm, Sollentuna (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 13/880,126

(22) PCT Filed: Mar. 14, 2013

(86) PCT No.: PCT/SE2013/050248
§ 371 (c)(1),
(2) Date: Apr. 18, 2013

(87) PCT Pub. No.: WO2014/142721
PCT Pub. Date: Sep. 18, 2014

(65) Prior Publication Data
US 2014/0269245 A1 Sep. 18, 2014

(51) Int. Cl.
*H04J 3/10* (2006.01)
*H04M 11/06* (2006.01)
(Continued)

(52) U.S. Cl.
CPC .............. *H04J 3/10* (2013.01); *H04M 11/062* (2013.01); *H04B 3/487* (2015.01); *H04L 5/1469* (2013.01)

(58) Field of Classification Search
CPC ......... H04J 3/10; H04B 3/487; H04L 5/1469; H04M 11/062
USPC ......................................................... 370/329
See application file for complete search history.

(56) References Cited

U.S. PATENT DOCUMENTS 6,650,697 B1 * 11/2003 Tate et al. .................... 375/222
7,376,157 B1   5/2008 Fazlollahi et al.
(Continued)

FOREIGN PATENT DOCUMENTS

EP    0 917 315 A2    5/1999
EP    2 237 470 A1   10/2010

OTHER PUBLICATIONS

ITU-T Recommendation G.994.1—Corrigendum 1 (Formerly CCITT Recommendation) International Telecommunication Union; Series G: Transmission Systems and Media, Digital Systems and Networks; Digital sections and digital line system—Access networks; Handshake procedures for digital subscriber line (DSL) transceivers; (Apr. 2000) 20 pp.

(Continued)

*Primary Examiner* — Shaq Taha
*Assistant Examiner* — Sasha Cintron Pacheco
(74) *Attorney, Agent, or Firm* — Myers Bigel & Sibley, P.A.

(57) ABSTRACT

The present invention relates to a method and a system for initiating bi-directional communication in a time-division duplex (TDD) communication system between a customer premises equipment (CPE) modem, such as a DSL modem, and an operator modem, such as a DSLAM. The invention is characterized in that the transmission of the CPE modem is aligned with the time-division duplex timing structure present in received crosstalk noise when transmitting initiation signals, so-called handshake tones.

18 Claims, 4 Drawing Sheets

(51) Int. Cl.
*H04B 3/487* (2015.01)
*H04L 5/14* (2006.01)

(56) References Cited

U.S. PATENT DOCUMENTS

| | | | |
|---|---|---|---|
| 2006/0153106 A1* | 7/2006 | Laakso et al. | 370/282 |
| 2008/0267392 A1 | 10/2008 | Raheja et al. | |
| 2010/0254444 A1* | 10/2010 | Clausen et al. | 375/220 |
| 2010/0278033 A1* | 11/2010 | Ilani | 370/201 |
| 2013/0208579 A1* | 8/2013 | Strobel et al. | 370/201 |
| 2014/0010270 A1* | 1/2014 | Shi et al. | 375/222 |
| 2014/0029406 A1* | 1/2014 | Liang et al. | 370/201 |
| 2014/0161000 A1* | 6/2014 | Fazlollahi et al. | 370/280 |
| 2014/0185701 A1* | 7/2014 | Liang et al. | 375/295 |
| 2014/0376604 A1* | 12/2014 | Verlinden et al. | 375/227 |

OTHER PUBLICATIONS

International Search Report and Written Opinion Corresponding to International Application No. PCT/SE2013/050248; Date of Mailing: Dec. 4, 2013; 11 Pages.

* cited by examiner

METHOD AND SYSTEM FOR INITIATING BI-DIRECTIONAL COMMUNICATION IN A TIME-DIVISION DUPLEX COMMUNICATION SYSTEM

CROSS-REFERENCE TO RELATED APPLICATION

This application is a 35 U.S.C. §371 national stage application of PCT International Application No. PCT/SE2013/050248, filed on 14 Mar. 2013, the disclosure of which is incorporated by reference herein in its entirety.

TECHNICAL FIELD

The present invention relates to a method, an apparatus, a system and a computer program for initiating bi-directional communication in a time-division duplex (TDD) communication system between a customer premises equipment (CPE) modem, such as a DSL modem, and an operator modem, such as a DSLAM.

BACKGROUND ART

In the industrialized world of today, most homes and businesses are connected to telephone networks using twisted pair copper wires. Those copper wires were originally used solely to carry data traffic in the analogue voice band. However, with the advancement of technology, particularly Digital Subscriber Line (DSL) access technology, the transfer of data over the higher frequencies in the twisted pair copper wires was made possible. The greatest advantage of DSL is that it enables data to be exchanged over the twisted pair copper wires at much higher speeds than conventional modems and analogue lines. The speeds at which data is exchanged over DSL now exceed 200 Mbit/s downstream using the current access technology standard very-high-bit-rate digital subscriber line 2 (VDLS2). Despite high transmission rates of today, DSL access technology is still being developed towards even higher transmission rates. It has been agreed in ITU-T that the next generation of DSL access technology will be utilizing transmission technology that separates the different transmission directions in the time domain instead of separating the transmission directions in the frequency domain, as is the case for present DSL access technology. A working name used during current standardization efforts for the next generation of time-division duplex DSL-based access technology is "G.fast".

DSL communication systems support high-speed data links between on the one side an operator modem or distribution point unit, possibly being part of Central Office equipment of a communication service provider, operator or network operator, and on the other side one or more residential network terminals serviced by the operator modem. Irrespective of used terminology, the two main pieces of equipment in a DSL communication system are a digital subscriber line access multiplexer (DSLAM) on the provider side of the communication service and numerous DSL modems on the customer side. In an ADSL or VDSL communication system, an available spectrum is subdivided into a plurality of tones, each of which carries either downstream information from the CO to a DSL modem or upstream information from the DSL modem to the CO. While the CO may provide service to a plurality of DSL modems, each serviced modem is coupled to the CO via a respective twisted pair of wires. Often, a large number of DSL connections are bundled together in one cable and then connected to a cabinet of other connecting terminals of an operator, network operator or other service provider.

The quality of the communication channel provided by a respective twisted pair or wires that couples a DSL modem to its servicing CO will have a substantial determination in the throughput that may be achieved between the CO and the DSL modem.

The quality of the communications channel between the CO and a serviced DSL modem depends upon a number of factors. One of these factors is distance, i.e. the distance from the CO to the DSL modem as signal attenuation increases with increased distance. Another factor is media quality, e.g. type of media, number of connections, etc. Still another factor is interference that may be coupled to the twisted pair or copper wires, often produced by a neighboring connection or by another DSL modem transmitting in the same frequency band. The interferences caused by the neighboring connections are usually referred to as crosstalk. Far-end crosstalk (FEXT) is caused by the far-end transmitters on neighboring lines, while near-end crosstalk (NEXT) is caused by the near-end transmitter on neighboring lines. Generally, NEXT is stronger than FEXT.

A DSL modem that powers up goes through initialization process including a synchronization procedure. The actual process varies from modem to modem but generally involves the steps of performing a self-test, checking the connection between the DSL modem and the computer or other customer equipment with which the DSL is connected, and finally synchronization with the DSLAM. Data can only be retrieved from the internet and thus reach a computer or other customer equipment when the DSL modem and the DSLAM are synchronized. The initialization process including synchronization is complex and involves tests that allow both sides of the connection to optimize the performance according to the characteristics of the line in use. Those tests relate to performance characteristics like modem capabilities, modes of operation, basic modulation parameters, etc.

The initialization procedure for setting up a connection between a DSL modem and a DSLAM according to the effective standard in ITU-T [G.994.1] will be described in more detail with reference to the following description. In DSL communication systems using time-division duplex structure, a problem related to the quality of communication is that a DSL modem during the start-up procedure is out of synchronization. Handshake signals in the beginning of the initialization procedure thus give rise to crosstalk that may cause disturbances to other existing communication channels. The interference caused could therefore deteriorate the quality of the communication channels. As mentioned, plural twisted pairs for DSL transmission are typically bundled together in the same cable binder and therefore, the crosstalk between neighboring lines may be a limiting factor for the communication service, its transmission capacity and quality.

To avoid that handshake signals during the start-up and initialization procedure will cause interference and disturb neighboring lines, the customer premises equipment must significantly reduce its output power. However, reduction of output power is not preferable, since the signal reach of the communication will then also be reduced, due to signal attenuation, i.e. a DSLAM might not be able to detect the initiation signal from a residential DSL modem if the distance there between is long enough.

SUMMARY OF THE INVENTION

It is an object of the present invention to alleviate the aforementioned problems by providing a method for initiating bi-directional communication in a time-division duplex (TDD) communication system between a customer premises equipment (CPE) modem and an operator modem, the method comprising the steps of: receiving noise induced by crosstalk for consecutive discrete time slots in the transmission frequency band, identifying the timing structure of time slots in the transmission frequency band, interpreting the direction of transmission in the time slots based on the present timing structure, aligning the transmission of the CPE modem with the time-division duplex timing structure present in the received noise, by transmitting initiation signals, so-called handshake tones, to the operator modem in time periods between downstream transmission slots, receiving by the CPE modem an initiation response signal, so-called handshake response signal, transmitted from the operator modem in downstream transmission time slots, and having conducted the initial handshake procedure, proceeding with a subsequent initiation procedure for establishing bi-directional communication between the CPE modem and the operator modem. The benefit of this method is that the CPE modem will be aligned in its timing structure with time slots for upstream transmission of neighboring connections during the initialization procedure, so as to avoid detrimental disturbances from occurring.

In accordance with a first embodiment of the present invention, and since the different received noise power levels are related to the TDD timeslots, the customer premises equipment can use this information to synchronize to the TDD structure and then only transmit handshake tones during upstream slots. The first step of synchronizing by means of detected crosstalk is to find out when in time the TDD frame changes transmission direction. This can be done by utilizing that the received power during so-called guard periods is lower than during the transmission slots.

Depending on whether the transmission direction is upstream or downstream, the DSL modem will be detecting near-end crosstalk (NEXT) or far-end crosstalk (FEXT).

In a second embodiment of the invention, the DSL modem gradually increases its power output level of when transmitting the handshake tones. This gradual increase continues until the power output level counteracts attenuation of the signal on its way to reaching the DSLAM, and has the advantage that disturbing noise in the form of near-end crosstalk can be minimized. Moreover, it is a way of adapting the power output to the real need instead of supplying excessive power.

In a third embodiment of the invention, the DSL modem transmits handshake tones of a frequency below and/or above the operational service segment of the transmission band and the DSLAM receiving handshake tones below and/or above the operational service segment. This has the advantage that disturbing noise in the form of near-end crosstalk can be avoided.

In a fourth embodiment of the invention, interpretation of the direction of transmission is made by identifying and utilizing pilot tones that carry information about the direction of transmission.

According to an alternative to the fourth embodiment of the invention, interpretation of the direction of transmission is made by identifying and utilizing synchronization symbols that carry information about the direction of transmission.

The advantage of exploiting the timing information from neighboring lines is that in case the neighboring lines are used for transmission in the so-called show-time mode, they will already be in synchronization with the DSLAM and thus the crosstalk, both far-end crosstalk and near-end crosstalk, received from them will follow the time-division duplex timing structure. If no neighboring lines are in the show-time transmission mode, no lines will be disturbed and as a consequence, the customer premises equipment can start the initiation procedure of transmission without further consideration to the positions of any guard periods or other timing-related concerns.

A further advantage of using identifiers of downstream and upstream transmission is that near-end and far-end crosstalk can never be mistaken. An example of such a topology is when a single short line is sharing cable binder with a number of longer lines.

The present invention also includes an apparatus, a system and a computer program, possibly on a data carrying means, for initiating bi-directional communication in a time-division duplex (TDD) communication system between a customer premises equipment (CPE) modem and an operator modem.

DETAILED DESCRIPTION

Throughout this document, the terms DSL modem and DSLAM have been used for the modems on either sides in the described communication system. It is however conceivable that the next generation of access technology standards, the so-called G.fast, will be using other terms, such as network terminals (NT) and distribution point units (DPU). Therefore, the description presented herein is intended to encompass also the next generation of transmission devices, irrespective of any designations and terms used in the standard for them. Moreover, in the following description, deployment of equipment is not limited to customer premises or to any central office environment. The operator modem, i.e. the distribution point unit or DSLAM, could be placed in a cabinet while the customer premises equipment modem for instance could be placed in a base transceiver station.

Figure 1:
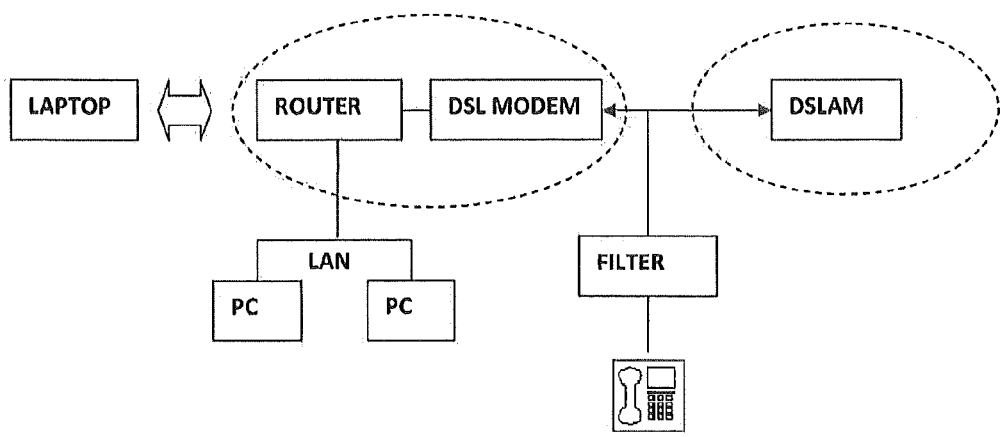
FIG. 1 is schematic representation of a set-up of a DSL connection and its typical pieces of equipment.

FIG. 1 shows a schematic diagram of a DSL connection. One the right side of the picture within the dashed ellipse, a DSLAM resides in the communication provider's central office, its distribution point or in a street cabinet. The rest of the equipment reside on the customer side and on the left side within the dashed ellipse is shown the customer premises equipment with an optional router, oftentimes integrally built with the DSL modem. This router manages a local area network (LAN) to which can be connected a number of personal computers. A wireless functionality of the same router also manages a wireless local area network (WLAN) to which can be connected a number of laptop computers.

In ADSL, the data throughput in the downstream direction, i.e. the direction from DSLAM to the DSL modem, is typically higher than the throughput in the opposite direction, hence the designation of asymmetric communication service.

Time-division duplexing (TDD), as opposed to frequency-division duplexing (FDD), is to separate downstream and upstream signals in the time domain. FDD separate the signals in the frequency domain. TDD has a strong advantage in the case where there is the mentioned asymmetry of the upstream and downstream data rates. As the amount of upstream data increases, more communication capacity can be dynamically allocated, and as the traffic load becomes lighter, capacity can be taken away. The same applies in the downstream direction.

In a TDD system, the upstream and downstream directions of transmission use the same frequencies. Thus, the fluctuation of crosstalk over frequency is small. Instead of different frequencies in a TDD system, the upstream and downstream directions of transmission are separated in time. In TDD systems, time is split to non-overlapped downstream time slots and upstream time slots. In downstream time slots, only downstream signals are transmitted on the line. In upstream time slots, only upstream signals are transmitted on the line. To overcome the NEXT in a TDD system, all lines need to be synchronized in downstream and upstream time slots. A CPE modem transmits handshake tones continuously in the same band as the downstream and the upstream transmission. The handshake tones therefore would be causing NEXT to neighboring lines in downstream time slots and FEXT to neighboring lines in upstream time slots. When NEXT is strong, it may cause packet errors on other lines.

In FDD systems like ADSL and VDSL, crosstalk from handshake signals is of the FEXT nature. Normally, crosstalk of the FXT nature will not cause any disturbances to neighboring lines, because of its relative weakness. However, in the TDD systems, handshake signals from the CPE modem will cause NEXT to downstream signals on neighboring lines.

The ITU-T standardization document [G.994.1] Recommendation G.994.1, entitled "Handshake Procedures for Digital Subscriber Line (DSL) Transceivers", published in June 1999, regulates initiation procedures in a communications system between a DSLAM and a DSL modem. This document addresses the so-called handshake procedure between DSL transceivers comprised in a DSL communication system. The term handshake includes the process of establishing bi-directional connection between the DSLAM and the DSL modem as well as synchronizing the pieces of equipment and using operating parameters for subsequent use as a high-speed data link between them, the so-called show-time phase.

Customer premises equipment generally refers to devices such as telephones, routers, switches, residential gateways, set-top boxes, fixed mobile convergence products, home networking adaptors. Throughout this document, CPE generally refers to internet access gateways that enable consumers to access services of communications service providers and distribute them around their residences via a wired or wireless LAN.

Figure 2:
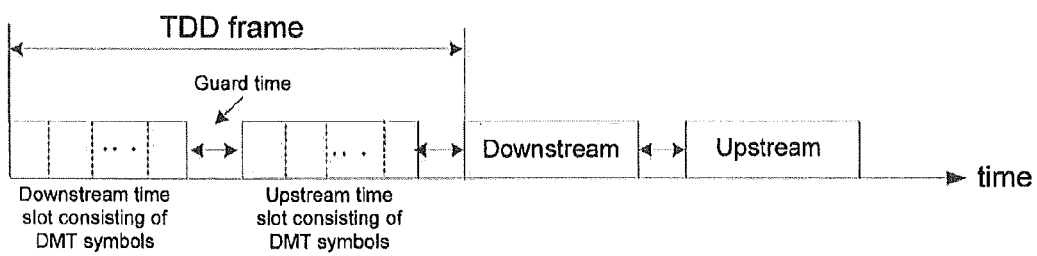
FIG. 2 shows an overview of a timing structure in a time-division duplex (TDD) communication system.

FIG. 2 shows an overview of a timing structure in a time-division duplex (TDD) communication system. As can be seen a downstream or upstream transmission time slot comprises of a number of discrete multi-tone (DMT) symbols. The time slots are also grouped into so called time-division duplex (TDD) frames, which comprises a downstream and an upstream transmission time slot, including guard times there between. During guard times, no crosstalk will occur. Guard times are necessary in access technology using a TDD transmission scheme in order to provide a silent section between the upstream and downstream time slots, in which a transceiver is allowed to switch between its transmission and receiver modes.

Figure 3:
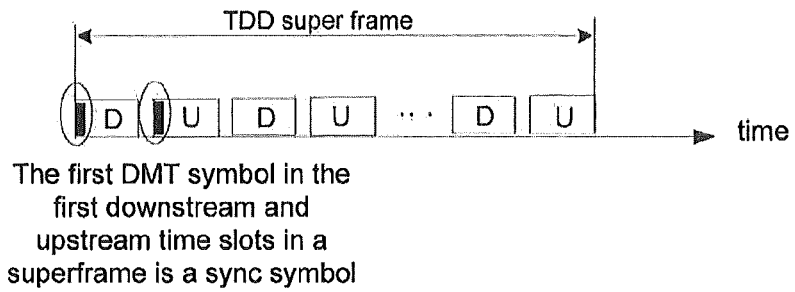
FIG. 3 displays an overview of a so-called super frame structure in a TDD communication system.

FIG. 3 displays an overview of a time frame structure in a TDD communication system. In the figure can be seen that a so-called super frame is created by grouping a number of TDD frames and inserting a specific DMT synchronization symbol is used as demarcation between two consecutive super frames. The synchronization symbol typically carries no data and consists of pseudorandom binary sequential (PRBS) data. The synchronization symbol can be used for different training purposes, as in DSL transmission technology. It is possible that G.fast will be specifying different synchronization symbols for identifying the downstream super frame and the upstream super frame.

Figure 4:
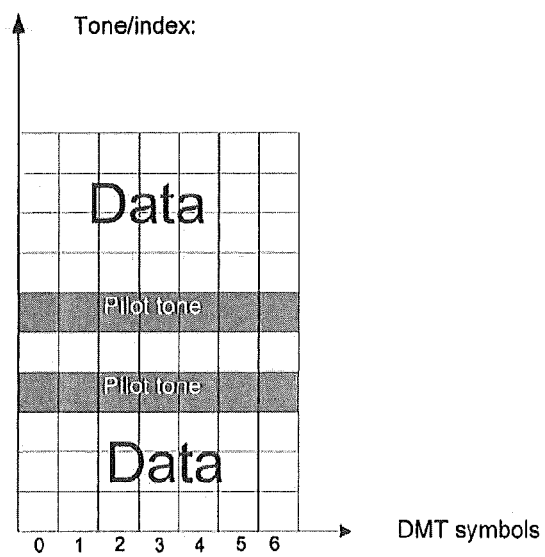
FIG. 4 depicts that tones within every discrete multi-tone (DMT) symbol are allocated as pilot tones.

FIG. 4 depicts that tones within every discrete multi-tone (DMT) symbol are allocated as pilot tones. G.fast is believed to utilize loop timing for the synchronization of the customer premises equipment. Loop timing means that the sampling clock of the customer premises equipment is dependent on the sampling clock of the DSLAM. In order to provide the customer premises equipment with synchronization information, there will in each downstream timeslot be provided tones, so-called pilot tones, for use as timing instruments by which the timing can be determined. FIG. 4 depicts how, merely as an example, two tones are used in every DMT symbol as pilot tones while the rest of the tones are used for transmission of data.

The timing information provided to the customer premises equipment according to FIG. 3 and FIG. 4 enables a customer premises equipment to detect information from received crosstalk from which it can determine whether slots contain upstream or downstream transmission. This allows the customer premises equipment to align its handshake signaling to the TDD timing structure in advance of the standardized initiation of transmission which is to follow.

Figure 5:
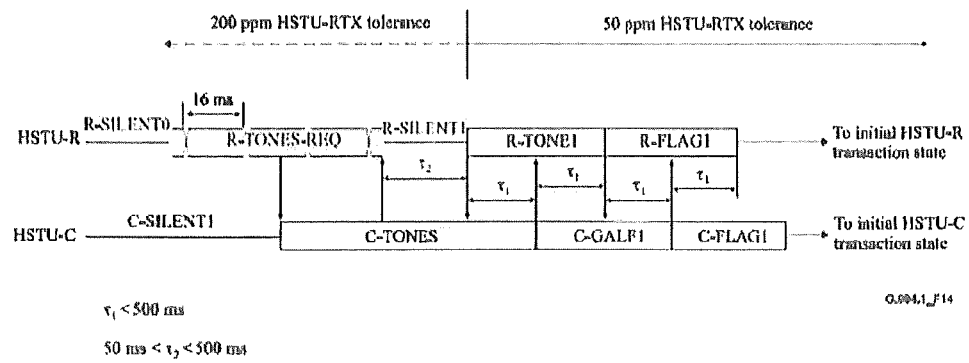
FIG. 5 displays in a prior art DSL system the timing for the remote DSL modem initiated duplex start-up procedure and the timing requirements between slots according to the effective standard ITU-T [G.994.1].

FIG. 5 depicts the timing of the standardized handshake process used in FDD systems for ADSL and VDSL according to [G.994.1], which is part of a duplex start-up procedure, when initiated by the remote DSL modem. The comprised modems and signals have been renamed compared to the standard designations in order to increase legibility and to achieve uniform notations throughout this document. In FIG. 5, which has been imported from the standard, HSTU-R is equivalent to DSL modem and HSTU-C is equivalent to DSLAM in this document.

Initially, the DSL modem is in state remote-SILENT0 transmitting silence, and the DSLAM (CO) is in state central-SILENT1 transmitting silence. The DSL modem shall initiate the start-up procedure by transmitting signals from one or both of its signalling families, with phase reversals every 16 ms (remote-TONES-REQ). When this has been detected by the DSLAM, the DSLAM shall respond by transmitting signals from one or both of its signalling families (central-TONES). When this has been detected by the DSL modem, the DSL modem shall transmit silence (remote-SILENT1) for 50 to 500 ms and shall then transmit signals from only one signalling family (remote-TONE1). The minimum detection time for central-TONES shall be 50 ms.

When the DSLAM has detected remote-TONE1, it shall respond by transmitting Galfs on modulated carriers (central-GALF1). When the DSL modem has detected Galfs, it shall respond by transmitting Flags on modulated carriers (remote-FLAG1). When the DSLAM has detected Flags, it shall respond by transmitting Flags (central-FLAG1). When the DSL modem has detected Flags, it shall begin the first transaction. FIG. 5 further shows the timing requirements between events that shall be adhered to. $\tau_1$ is the time period from detection of a signal (e.g., remote-TONE1) to the transmission of the next signal (e.g., central-GALF1).

Figure 6:
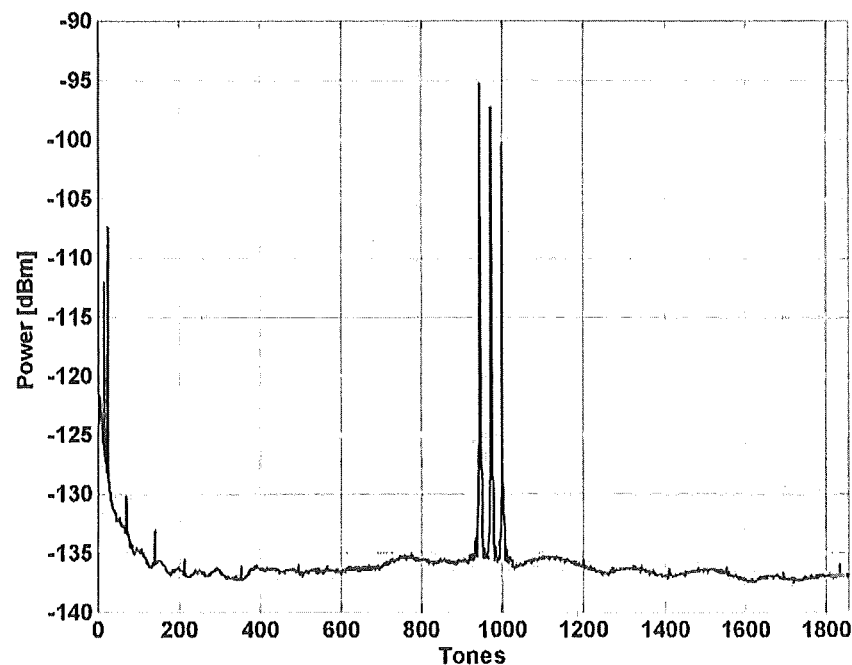
FIG. 6 displays a graphic representation of near-end crosstalk (NEXT) from handshake tones.

FIG. 6 displays a graphic representation of near-end crosstalk (NEXT) from handshake tones. In the diagram comparison is made of a signal containing crosstalk and signal without crosstalk. The handshake tones are transmitted from a multimode customer premises equipment that is configured to transmit both ADSL tones (tone 9, 17 and 25) and VDSL2 tones (tone 944, 972 and 999). This shows the NEXT from handshake tones is much higher than the noise floor.

Figure 7:
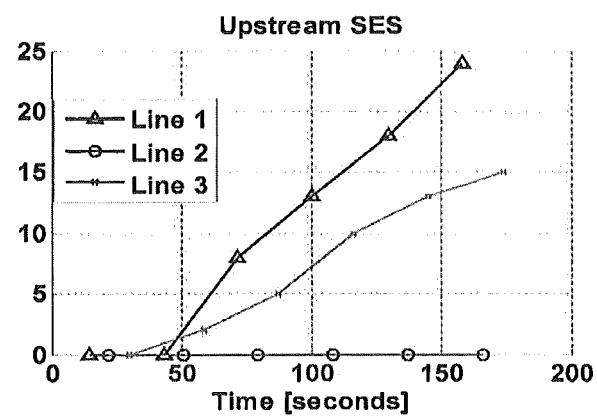
FIG. 7 is a graphic representation of severely errored seconds (SES) in transmission that has been disturbed by near-end crosstalk from handshake tones.

FIG. 7 is a graphic representation of severely errored seconds (SES) in transmission that has been disturbed by near-end crosstalk from handshake tones. SES is a performance metric defined in the standard document ITU-T [G.997.1]. If there are SESs on a line it is an indication of poor quality, typically caused by uncorrectable bit errors caused by noise. Occurrence of SES will severely reduce the performance and stability of services running over a transmission line. This shows the NEXT from handshake tones causes a lot of packet errors.

SES is declared if there are at least 18 cyclic redundancy check (CRC) anomalies during a one second interval. SES is also declared for the defects loss of signal (LOS), severely errored frame (SEF) or loss of power (LPR), also defined in G.997.1. SES counters can typically be retrieved from the DSLAM using simple network management protocol (SNMP), which could be described as an Internet standard protocol for managing devices in IP networks.

There are many standardized ways of measuring and detecting received noise levels. One measurement method is to record the output from an A/D converter. A second measurement method is to record the signals after having made a Fast Fourier Transform (FFT). The average power level received can be measured over the entire or a subset of the frequency range. It is important to measure over short periods of time since the results may otherwise be averaged over several time slots. Preferably the noise measurement should be sampled over every discrete multi-tone (DMT) symbol.

Figure 8:
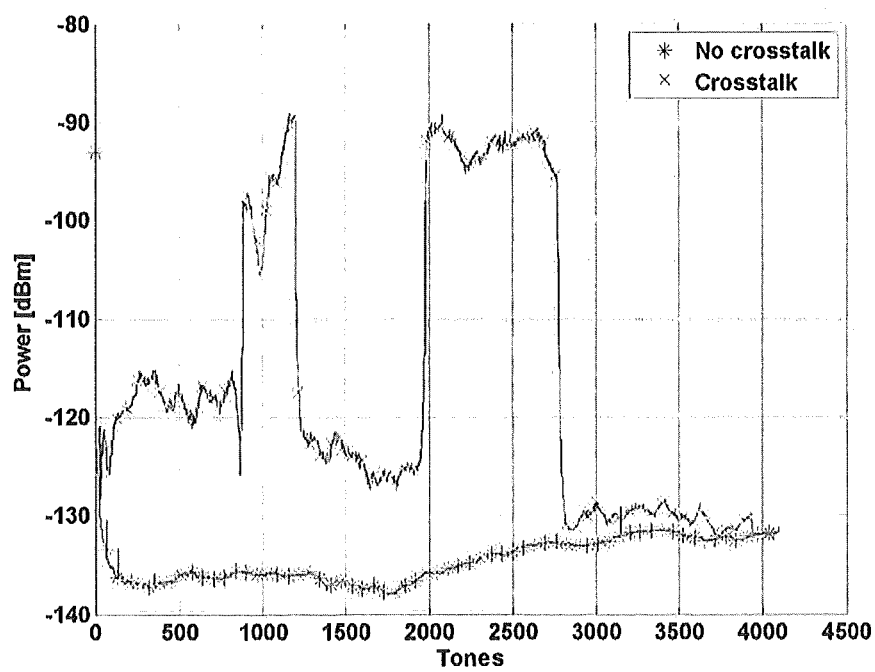
FIG. 8 depicts crosstalk in a frequency-division duplex (FDD) system.

FIG. 8 depicts crosstalk in a frequency-division duplex (FDD) system. In the measurement, VDSL equipment is used to illustrate various kinds of crosstalk. Measurement is made from the customer premises equipment side of the communication system, which is disturbed by three VDSL2 disturbers and compared with a line without disturbers. Since VDSL2 is a DSL access technology using FDD modulation, the upstream and downstream transmissions are separated in frequency. FEXT is weaker than NEXT since it has the signal has traveled further and been exposed to attenuation. This can be seen in the figure where the upstream transmission is located at tones 870-1204 and 1972-2781, whereas the downstream communication is located at tones 32-859, 1205-1971 and 2782-4095.

Detection of state changes from measured data normally yields a substantial difference in received power between a guard time and a transmission slot. Guard times could for example be detected by simply searching for the lowest power in the measured data. In order to realize such measurement, a moving average window can be used to reduce the effect of impulses. Another method is to find the state changes by searching for local maxima and minima in the derivative of a recorded time vector. Every maximum then corresponds to the start of an upstream or downstream slot while every minimum corresponds to the start of a guard band. Extra robustness could be added by filtering out outliers in the derivate since the extreme points should be repetitive and the lengths of the timeslots are known.

Figure 9:
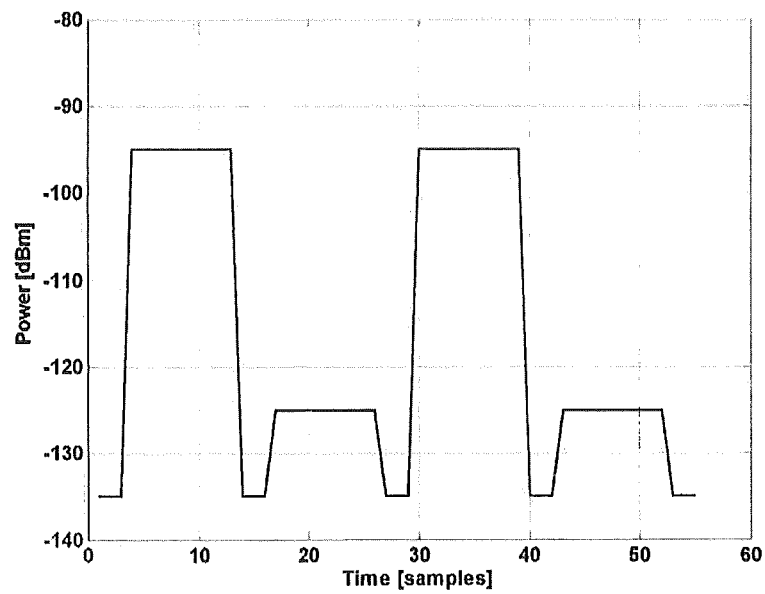
FIG. 9 exemplifies crosstalk received in a time-division duplex (TDD) system.

FIG. 9 exemplifies crosstalk received in a time-division duplex (TDD) system. An alternative method of determining the transmission direction of the TDD states, that requires no additional information than presently standardized, is to look directly at the power level of each timeslot. A victim line will typically receive NEXT of higher power level during an upstream transmission timeslot than the power level of FEXT during downstream transmission timeslots. The upstream transmission timeslot could hence be directly detected by finding the timeslots with the highest power of crosstalk. The figure illustrates the power level of NEXT being about −95 dBm, FEXT about −125 dBm and background noise about −135 dBm. If a line in a TDD system would receive the same crosstalk levels and measure noise as mentioned above, the results would be similar.

When an appropriate method has been used to detect the upstream slots the CPE can continue the handshake procedure by transmitting handshake tones and waiting for the DSLAM to respond. Since the crosstalk synchronization might not be very precise the HS tones can be placed in the middle of the upstream slot and thus use an extra large guard time in order to minimize the risk of disturbing neighboring lines due to the imperfect detection accuracy. Another method of reducing the risk of disturbing is to start transmitting the HS tones with relatively low power, and then slowly increasing the power over time until the DSLAM responds. From the point where the DSLAM responds a procedure similar to the one specified in G.994.1 can be reused.

The several embodiments described herein are solely for the purpose of illustration. The various features described herein need not all be used together, and any one or more of those features may be incorporated into one single embodiment. Therefore, persons skilled in the art will recognize from this description that other embodiments may be practiced with various modifications and alterations.

The invention claimed is:

1. A method at a customer premises equipment (CPE) modem for initiating bi-directional communication in a time-division duplex (TDD) communication system between the CPE modem and an operator modem, the method comprising:
   receiving by the CPE modem noise induced by crosstalk for consecutive discrete time slots in a transmission frequency band,
   identifying at the CPE modem a timing structure of time slots in the transmission frequency band using the noise induced by crosstalk for the consecutive discrete time slots,
   interpreting at the CPE modem a direction of transmission in the time slots based on the timing structure identified using the noise induced by crosstalk,
   aligning transmission of the CPE modem with the time-division duplex timing structure present in the received noise induced by crosstalk, by transmitting initiation signals from the CPE modem to the operator modem in time periods between downstream transmission slots,
   receiving by the CPE modem an initiation response signal transmitted from the operator modem in downstream transmission time slots, and
   after transmitting the initiation signals and after receiving the initiation response, proceeding at the CPE modem with a subsequent initiation procedure to establish bi-directional communication between the CPE modem and the operator modem;

wherein the initiation signals comprise handshake tones, and wherein the initiation response signal comprises a handshake response signal.

2. The method according to claim 1, wherein the CPE modem is a digital subscriber line (DSL) modem or a network terminal (NT) and/or wherein the operator modem is a digital subscriber line access multiplexer (DSLAM) or a distribution point unit (DPU).

3. The method according to claim 1, wherein receiving the noise induced by crosstalk comprises receiving the noise induced by crosstalk in response to switching on the CPE modem.

4. A method at a customer premises equipment (CPE) modem for initiating bi-directional communication in a time-division duplex (TDD) communication system between the CPE modem and an operator modem, the method comprising:
  receiving by the CPE modem noise induced by crosstalk for consecutive discrete time slots in a transmission frequency band,
  identifying at the CPE modem a timing structure of time slots in the transmission frequency band using the noise induced by crosstalk for the consecutive discrete time slots,
  interpreting at the CPE modem a direction of transmission in the time slots based on the timing structure identified using the noise induced by crosstalk,
  aligning transmission of the CPE modem with the time-division duplex timing structure present in the received noise induced by crosstalk, by transmitting initiation signals from the CPE modem to the operator modem in time periods between downstream transmission slots,
  receiving by the CPE modem an initiation response signal transmitted from the operator modem in downstream transmission time slots, and
  after transmitting the initiation signals and after receiving the initiation response, proceeding at the CPE modem with a subsequent initiation procedure to establish bi-directional communication between the CPE modem and the operator modem;
  wherein the timing structure of time slots in the transmission frequency band displays a variation in power with time slots of higher or lower power than average power over the transmission frequency band.

5. The method according to claim 1, wherein identifying a timing structure comprises identifying a periodicity of the time slots in the transmission frequency band using a predetermined variation of power of the noise induced by crosstalk to differentiate time slots.

6. The method according to claim 1, wherein transmitting initiation signals comprises repeating the transmission of initiation signals a predetermined number of times or until the operator modem responds.

7. The method according to claim 1, wherein the noise induced by crosstalk is either near-end crosstalk or far-end crosstalk.

8. The method according to claim 1, wherein transmitting the initiation signals comprises gradually increasing a power output level of the CPE modem when transmitting the initiation signals until the initiation response signal is received from the operator modem.

9. The method according to claim 1, wherein interpreting the direction of transmission comprises identifying pilot tones from the noise induced by crosstalk, wherein the pilot tones carry information about the direction of transmission.

10. The method according to claim 1, wherein interpreting the direction of transmission comprises identifying synchronization symbols from the noise induced by crosstalk, wherein the synchronization signals carry information about the direction of transmission.

11. The method according to claim 10, wherein the synchronization symbols are different for each direction of transmission.

12. The method according to claim 1, wherein interpreting the direction of transmission comprises assuming that an upstream direction of transmission generates a higher power level in the noise induced by crosstalk than a downstream direction of transmission.

13. The method according to claim 1, wherein the initiation response signal, which is transmitted from the operator modem and is received by the CPE modem, contains timing information that is used by the CPE modem to align its subsequent transmission with enhanced precision in timing.

14. The method according to claim 1, further comprising:
  the CPE modem utilizing information on the timing structure interpreted during previous initiation procedures to predict a timing structure during a subsequent initiation of communication.

15. A customer premises equipment (CPE) modem for initiating bi-directional communication in a time-division duplex (TDD) communication system between the CPE modem and an operator modem, the CPE modem comprising:
  a receiver adapted to receive noise induced by crosstalk for consecutive discrete time slots in a transmission frequency band, and
  a processor adapted to identify a timing structure of time slots in the transmission frequency band using the noise induced by crosstalk for the consecutive discrete time slots, to interpret a direction of transmission in the time slots based on the timing structure identified using the noise induced by crosstalk, and to align transmission of the CPE modem with a time-division duplex timing structure present in the received noise, by transmitting initiation signals to the operator modem in time periods between downstream transmission slots,
  the receiver being further adapted to receive an initiation response signal transmitted from the operator modem in downstream transmission time slots, the processor is further adapted to proceed with a subsequent initiation procedure to establish bi-directional communication between the CPE modem and the operator modem after transmitting the initiation signals and after receiving the initiation response;
  wherein the initiation signals comprise handshake tones, and wherein the initiation response signal comprises a handshake response signal.

16. The CPE modem according to claim 15, wherein the processor is adapted to identify a timing structure by identifying a periodicity of the time slots in the transmission frequency band using a predetermined variation of power of the noise induced by crosstalk for differentiation.

17. The CPE modem according to claim 15, wherein the processor is adapted to interpret the direction of transmission by identifying pilot tones from the noise induced by crosstalk, wherein the pilot tones carry information about the direction of transmission.

18. The CPE modem according to claim 15, wherein the processor is adapted to interpret the direction of transmission by identifying synchronization symbols from the noise induced by crosstalk, wherein the synchronization signals carry information about the direction of transmission.

* * * * *